United States Patent [19]
Neter et al.

[11] Patent Number: 6,139,789
[45] Date of Patent: Oct. 31, 2000

[54] COMPACT POST-MOLD COOLING DEVICE AND METHOD FOR THERMALLY CONDITIONING MOLDED ARTICLES

[75] Inventors: Witold Neter, Newnan, Ga.; Faisal Oueslati, Mississauga; Gheorghe Olaru, Toronto, both of Canada

[73] Assignee: Husky Injection Molding Systems Ltd., Canada

[21] Appl. No.: 09/294,568

[22] Filed: Apr. 20, 1999

Related U.S. Application Data

[60] Provisional application No. 60/094,793, Jul. 31, 1998.

[51] Int. Cl.⁷ .................................................. B29C 49/64
[52] U.S. Cl. .................... 264/535; 264/237; 264/537; 425/526; 425/532; 425/534; 425/547
[58] Field of Search ................................ 264/328.14, 458, 264/535, 537, 237; 425/174.4, 526, 532, 534, 547

[56] References Cited

U.S. PATENT DOCUMENTS

| | | | |
|---|---|---|---|
| 4,209,290 | 6/1980 | Rees et al. ............................ | 425/526 |
| 4,313,720 | 2/1982 | Spurr ...................................... | 425/526 |
| 4,435,146 | 3/1984 | Wiatt et al. ............................ | 425/534 |
| 4,470,797 | 9/1984 | Harry et al. ........................... | 425/534 |
| 4,586,891 | 5/1986 | Ichizawa et al. ..................... | 425/526 |
| 4,592,719 | 6/1986 | Bellehache et al. .................. | 425/526 |
| 4,836,767 | 6/1989 | Schad et al. ........................... | 425/556 |
| 5,232,715 | 8/1993 | Fukai ..................................... | 425/526 |
| 5,772,951 | 6/1998 | Coxhead et al. ...................... | 264/537 |

FOREIGN PATENT DOCUMENTS

| | | | |
|---|---|---|---|
| 4212115 | 6/1993 | Germany ............................. | 425/526 |
| 7-171888 | 7/1995 | Japan . | |

*Primary Examiner*—Robert Davis
*Attorney, Agent, or Firm*—Bachman & LaPointe, P.C.

[57] ABSTRACT

The present invention relates to a multi-stage, post-mold cooling method and apparatus used in conjunction with an injection molding machine having an aggressive cycle time and a high output. The apparatus of the present invention includes a thermal conditioning device/station with cooling tubes for keeping separate the preforms of each batch and effecting cooling of the molded preforms, several separated cooling levels for simultaneously cooling multiple batches of preforms, and internal devices for automatically transferring each batch of molded preforms from one cooling level to the next. In a preferred embodiment, the thermal aconditioning device/station is partially sealed to create a controlled temperature environment for conditioning the molded articles. In another embodiment, the thermal conditioning device/station includes a level for re-heating the preforms.

49 Claims, 7 Drawing Sheets

COMPACT POST-MOLD COOLING DEVICE AND METHOD FOR THERMALLY CONDITIONING MOLDED ARTICLES

CROSS-REFERENCE TO RELATED APPLICATION(S)

This application is related to and claims the benefit of provisional application serial No. 60/094,793, filed Jul. 31, 1998, entitled COMPACT POST-MOLD COOLING DEVICE, to Witold Neter et al.

BACKGROUND OF THE INVENTION

The present invention relates to a multi-stage, post-mold temperature conditioning method and apparatus used in conjunction with an injection molding machine having an aggressive cycle time and a high output. Temperature conditioning means either cooling or cooling and re-heating or re-heating only.

Reduction of the injection molding cycle time is a major task when forming articles in huge volume. This is for example the case of PET preforms that are formed using high cavitation molds, such as for example the 72 or 96 cavity molds made by Husky Injection Molding Systems. One option to reduce the molding cycle time is to limit the residence time of the preforms in the mold closed position by shortening the cooling step by a few seconds and thus ejecting the preforms from the mold sooner. The temperature gradient across the walls of a preform indicates formation of inner and outer skin layers which are colder than the internal layer. This is caused by the fact that in the closed mold position, cooling is done from both the cavity and the core side.

Numerous attempts have been made in the past to improve the post-mold cooling process when forming PET preforms. U.S. Pat. No. 4,209,290 to Rees et al., for example, illustrates a system in which preforms or parisons to be blow-molded into bottles are produced in cavities of a lower mold half of a vertical injection-molding machine with the aid of respective cores depending into the cavities from an upper mold halve when the mold is closed. As the two mold halves separate, the parisons adhere to the respective cores for which they are subsequently discharged into respective nests of a transfer box or respective cells of a blow-molding unit interposed between the mold halves. In the first instance, the parisons are cooled by a circulating air stream while the transfer box is laterally withdrawn before the start of a new injection-molding cycle, the rigidified parisons are then released from their nests to drop into pockets of an underling conveyor transporting them to a blow-molding station. In the second instance, the cores are hollow and descend with their parisons into the blow-molding cells whose split walls are closed around the cores by fluidic or mechanical means. There the parisons are inflated by air injected through the cores whereupon the finished bottles are extracted from these cells after the blow-molding unit has been laterally withdrawn and while a new injection cycle takes place.

U.S. Pat. No. 4,836,767 to Schad et al. illustrates an apparatus for producing molded plastic articles which apparatus is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic articles when in the cooling position, and a device for moving the carrier plate along a first axis so that the aligned mold portions abuts the stationary mold half and the second mating mold portion simultaneously brings each plastic article thereon into contact with the cooling device.

U.S. Pat. No. 5,232,715 to Fukai illustrates an apparatus for cooling and solidifying a preform. The apparatus involves introducing a preform in a heated stated released from an injection mold into a cooling tube having a bottom opening and an upper opening through which cooling air flows from the bottom opening to the upper opening. The bottom opening is provided with a fan for cooling air. The preform is forcibly cooled from the interior and the exterior by cooling air flowing in a turning state between the preform and a coolant supplied to a cooing core which has been inserted into the preform.

Japanese Patent Document No. 7-171888 to Hirowatari et al. relates to a forced cooling apparatus for preforms. The apparatus comprises a cooling tool for supporting a plurality of preforms, a first air cooling means disposed above the cooling tool for spouting cooling air inside of the preforms, and a second air cooling means disposed beneath the cooling tool for spouting cooling air outside of the preforms.

U.S. Pat. No. 5,772,951 to Coxhead et al., assigned to the assignee of the instant application and which is hereby incorporated by reference herein, relates to a preforms storage and temperature conditioning device that connects a single or several injection molding machines to a blow molding station. This allows the injection molding machine to run while the blow molding does not. The preforms storage device of the '951 patent receives a plurality of preform carriers, each holding molded preforms. According to the '951 patent, the preforms released from the mold are cold enough to avoid problems like crystallinity, deformation and surface damage. These preforms are stored and temperature conditioned so that they are ready, in terms of temperature and number, for the step of blow molding. The '951 patent does not teach a multi-stage and compact cooling station that receives still very warm and freshly molded preforms. The '951 patent also does not teach a method and a post mold cooling station used to prolong the cooling time of the preforms without affecting the injection cycle time.

Post-mold cooling becomes more critical and difficult to implement as the injection molding cycle time is reduced. This is especially true when forming blowable preforms made of resins such as PET. Because the in-mold cooling is shorter than usual, the preforms ejected from the mold are solidified outside and inside but are still very warm and hot and not fully solidified inside the walls. This internal heat may re-heat and reduce the strength of the inner and the outer skin layers of the preforms, and thus the preforms are vulnerable to damage or to sticking together. Currently, the preforms molded using a fast cycle time and that are post-mold cooled using known methods and equipment are still sufficiently warm when they are dropped onto a conveyor. They can thus stick together or be damaged by the impact to the conveyor or other preforms during manipulation. If the cooling time is prolonged on a take-out plate or other known cooling devices somehow connected to the injection molding machine, this will increase the cycle time.

It remains very important to develop a method and apparatus for maintaining the temperature of the skin layers as low as possible after opening the mold and during the ejection, post mold cooling and handling of the preforms.

After the injection process, the molded preforms are directed to a blow mold where they are blown into finish articles such as bottles or jars. Before the blowing process, the preforms are re-heated to the blowing temperature. The blowing process can take place immediately after the injection process using for example an integrated injection-blow molding machine. In some instances, the preforms blown using this approach are not completely cooled so less heat is needed during re-heating. In a different approach, the preforms are fully cooled after molding and then stored and sent to a different location for the full re-heating and final blow molding process.

The re-heating process require a careful monitoring so that all the preforms have the same temperature before the blowing step. This is not easy to achieve using a compact and simple equipment.

It remains important to provide a simple method and high output apparatus for cooling and re-heating the preforms after the injection and prior to the blow molding process.

SUMMARY OF THE INVENTION

Accordingly, it is an object of the present invention to provide a method and apparatus which prolongs the cooling time of the preforms without increasing the cycle time and without increasing the size of the molding system.

It is a further object of the present invention to provide an apparatus as above which uses a modular and compact cooling device without compromising the injection cycle time.

It is a further object of the present invention to provide a method and an apparatus as above which is suited to cool blowable preforms made of a single or multiple materials.

It is a further object of the present invention to provide a method and apparatus for temperature conditioning molded preforms prior to the blow molding process.

According to the current invention the temperature conditioning process could be a multistage cooling process, a multistage cooling process followed by re-heating or a multistage re-heating process. In all cases the process takes place within the same compact equipment where the preforms are dropped from a station to the next.

The foregoing objects are attained by the method and apparatus of the present invention.

As previously discussed, the present invention relates to a multi-stage, post-mold cooling method and apparatus used in conjunction with an injection molding machine having an aggressive cycle time and a high output. The apparatus of the present invention includes a thermal conditioning device/ station having means for keeping separate the preforms of a plurality of batches, several separated levels for simultaneous cooling of said batches, and internal means for automatically transferring each batch of molded preforms from one level to the next. In a preferred embodiment, the thermal conditioning device/station is partially sealed to create a controlled temperature environment for conditioning the molded articles.

The method for thermally conditioning molded articles of the present invention broadly comprises the steps of forming a plurality of molded articles in a molding machine, removing said molded articles from said molding machine while the articles are warm and not fully solidified, providing a thermal conditioning station having at least two internal thermal conditioning levels, transferring the molded articles to a first level of the thermal conditioning station, and thermally conditioning the molded articles within the first level after the transferring step to improve the quality of the molded articles without increasing mold cycle time by subjecting the molded articles to at least one thermal treatment. In one embodiment of the present invention, the method further includes the steps of receiving a first batch of molded articles into the first cooling level of the thermal conditioning station/device; cooling the first batch of molded articles; freely dropping the first batch of molded articles towards a second cooling level of the thermal conditioning device/station; receiving a second batch of molded articles into the first cooling level; and cooling the first and second batches of molded articles simultaneously. In a further embodiment of the method of the present invention, the first batch of molded articles is freely dropped towards a first re-heating level in the thermal conditioning station/device.

The present invention solves the prior art cooling problem by removing the warm preforms from the post molding handling and cooling devices that directly serve the injection molding machine. The present invention uses a novel thermal conditioning station/device which receives warm preforms in any quantity (several batches of tens of preforms) that are cooled for as long as necessary to avoid any quality issues.

Other details of the method and apparatus of the present invention, as well as other objects and advantages attendant thereto, are set forth in the following description and the accompanying drawings wherein like reference numerals depict like elements.

DETAILED DESCRIPTION OF THE PREFERRED EMBODIMENT(S)

Figure 1:
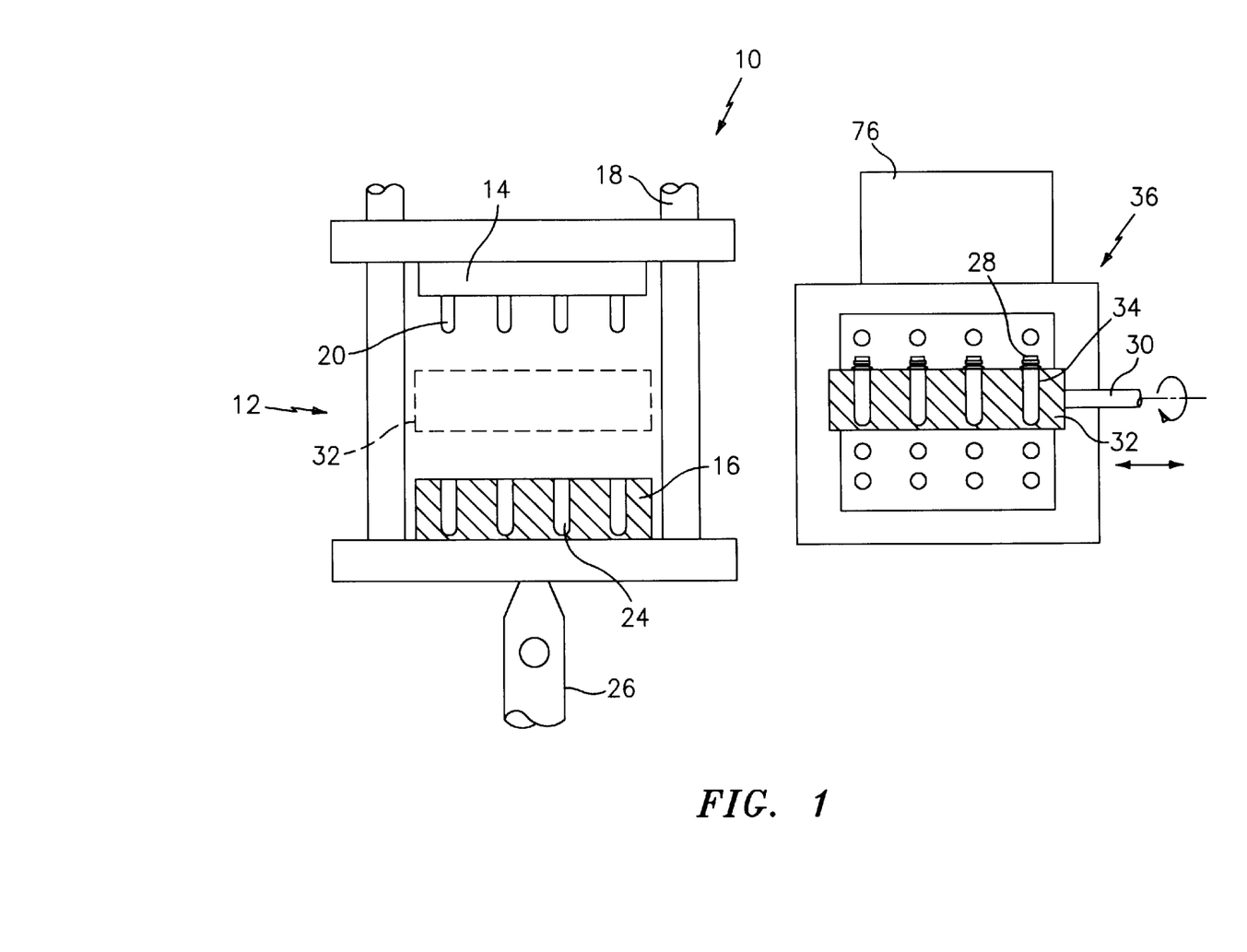
FIG. 1 is a top view of an injection molding system which includes the innovative thermal conditioning device of the present invention.

Referring now to the drawings, FIG. 1 illustrates an injection molding system 10 which includes an injection molding machine 12 having a mold formed by a mold core plate 14 and a mold cavity plate 16. The mold core plate 14 has a plurality of mold cores 20 and the mold cavity plate 16 has a plurality of cavities 24. Generally, the number of cores 20 equals the number of cavities 24.

The mold core plate 14 moves axially along tiebars 18 in a known manner between a mold open position and a mold closed position. When the mold core plate 14 is in the mold closed position, it forms a plurality of cavity spaces (not shown) with the mold cavity plate 16. An injection unit 26 feeds molten material(s) into each cavity space via known runner systems (not shown) and/or sprue gates (not shown). While the mold remains closed, the newly formed molded articles 28, such as preforms to be used in a blow molding system, are slightly cooled by cooling channels (not shown) in the mold cores 20 and the mold cavity plate 16.

A robot 30 which includes a take-out plate 32 is provided. The take-out plate 32 has a number of holders 34 for receiving molded articles 28 from the mold cores 20. In operation, the take-out plate 32 moves between the mold cavity plate 16 and the mold core plate 14 when the mold plates 14 and 16 are in the mold open position. After aligning empty holders 34 with the cores 20, the molded articles 28 are stripped from the cores 20 in a known manner such as by using an ejector plate (not shown) and received in the holders 34. The take-out plate 32 is then withdrawn to a position adjacent the injection molding machine 12 and the molding cycle is repeated.

The take-out plate 32 is then rotated 90 degrees to align the molded articles 28 with a thermal conditioning device 36 in accordance with the present invention.

The means for moving the take-out plate 32 axially between a position outboard of the injection molding machine and a position between the plates 14 and 16 and for rotating the take-out plate 32 may comprise any suitable means known in the art.

Figure 2:
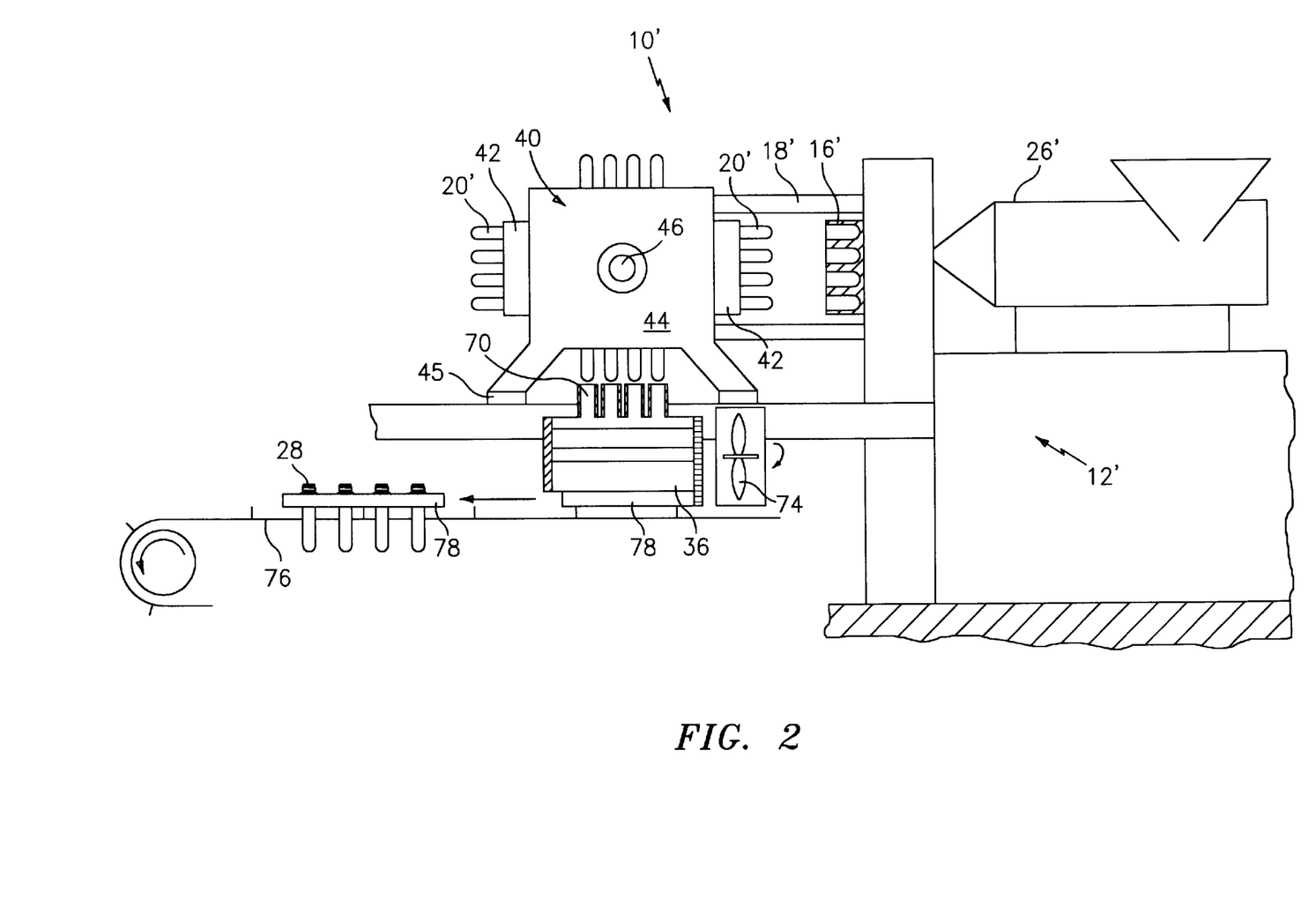
FIG. 2 is a side view of an alternative injection molding system including a rotary turret injection molding machine and the innovative thermal conditioning device of the present invention.
Figure 3A:
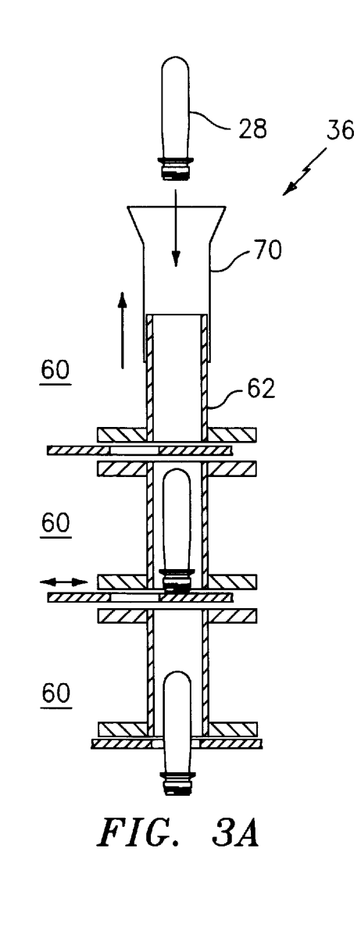
FIGS. 3(A)–3(D) are schematic representations of a preform passing through a thermal conditioning device according to the present invention.
Figure 3B:
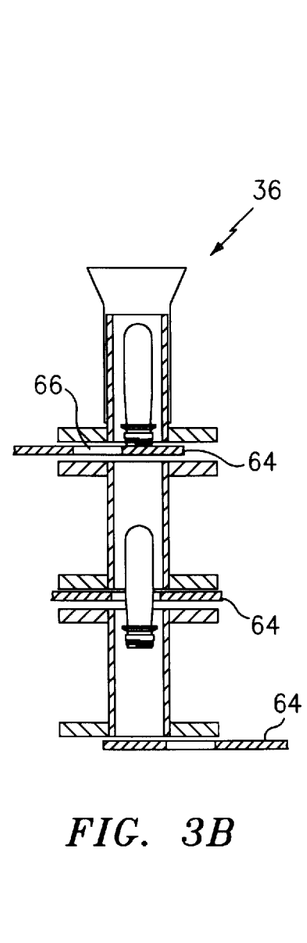
Figure 3C:
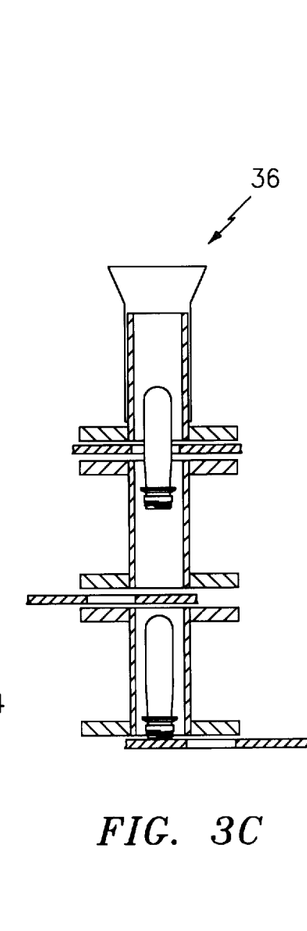
Figure 3D:
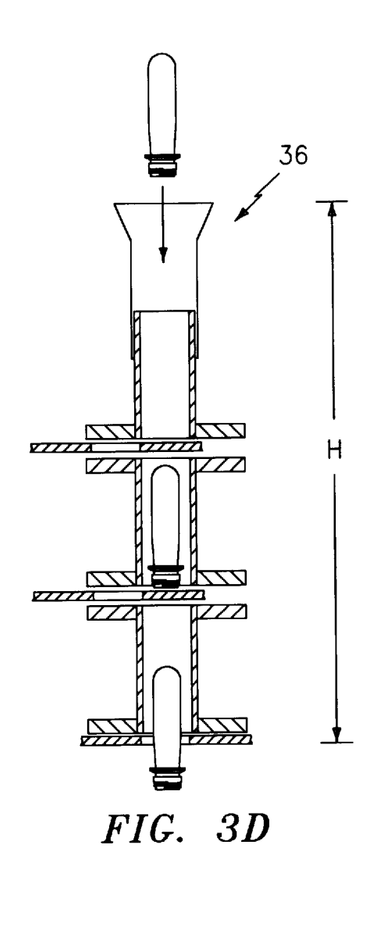

Referring now to FIG. 2, an alternative injection molding system 10' is illustrated. The system 10' includes an injection molding machine 12' having a mold cavity plate 161 and a rotary turret core plate device 40 which is axially movable along a plurality of tiebars 18' between a mold open position (shown in FIG. 2) and a mold closed position. When in the mold closed position, the rotary turret core plate device 40 forms a plurality of cavity spaces (not shown). An injection unit 26' feeds molten material(s) into the cavity spaces to form a plurality of molded articles 28.

The rotary turret core plate device 40 has a central block (not shown) mounted for rotation about an axis 46 by trunnions in a pair of side plates 44. A plurality of core plates 42, such as four such plates, are mounted to the central block. Each core plate 42 has a plurality of cores 20' connected thereto or integrally formed therewith. The number of cores 20' on each plate 42 generally corresponds to the number of cavities in the cavity plate 26'. The side plates 44 each have arms with pads 45 for allowing movement of the device 40 along the tiebars 18'. Any suitable means known in the art may be used to rotate the central block and thus the core plates 42 about the axis 46. Similarly any suitable means known in the art may be used to move the device 40 between the mold open and mold closed positions.

The cavity plate 16' and the device 40 are provided with means (not shown) for cooling the newly formed molded articles or preforms 28 while they are in the mold cavity spaces. The cooling means may comprise any suitable cooling means known in the art.

After a first batch of articles 28 have been molded, the device 40 is moved to the mold open position and rotated so that a new core plate 42 with cores 20' is aligned with the cavity plate 26'. In this way, a plurality of batches of molded articles can be rapidly formed. If desired, the batches of molded articles 28 on the cores 20' can be further cooled as the core plate device 40 rotates. When a core plate 42 with molded articles 28 reaches the lowermost position, the articles 28 are ejected from the cores 20' into the thermal conditioning device 36 of the present invention. Any suitable means (not shown) known in the art may be used to eject the articles 28. For example, a stripper plate or ejection pins may be used.

Figure 4A:
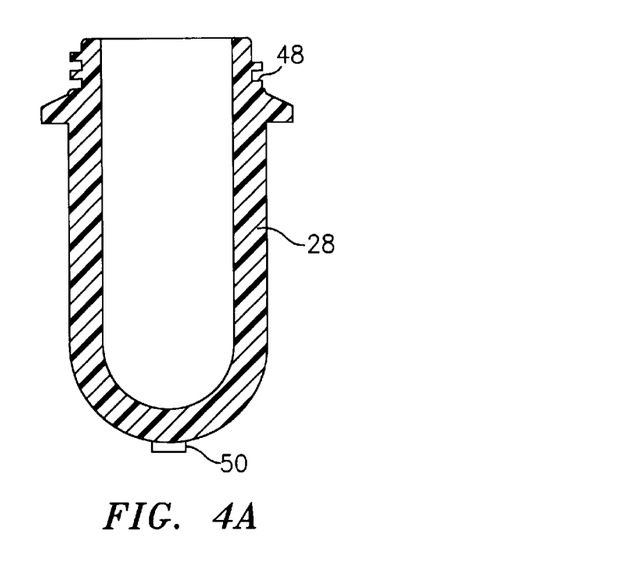
FIG. 4(A) is a sectional view of a preform.
Figure 4B:
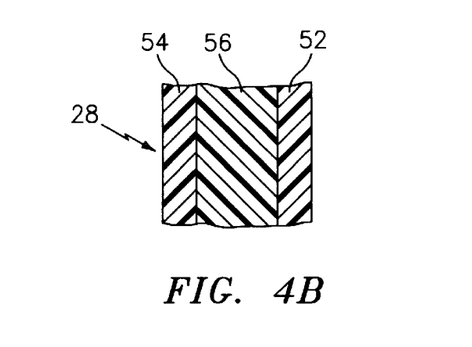
FIG. 4(B) is an exploded view of a wall of the preform of FIG. 4(A)
Figure 4C:
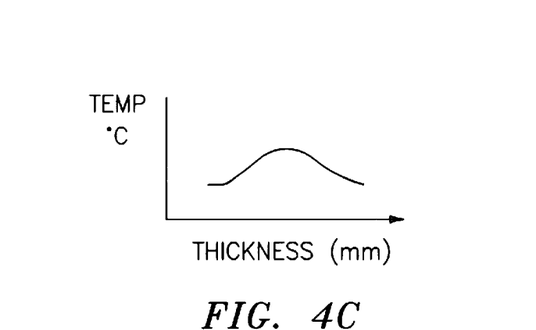
FIG. 4(C) illustrates the temperature gradient across the wall thickness.

As shown in FIGS. 4(A)–4(C), a typical preform 28 has a neck finish portion 48 and a sprue gate or dome portion 50. Because the preforms 28 are removed from the mold while still warm, the retained heat can cause crystallinity in the portions 48 and 50. Thus, post-mold cooling is needed to prevent crystallinity. A typical wall structure of such a preform is illustrated in FIG. 4(B). As shown therein, the wall includes a warm inner skin 52, a warm outer skin 54, and a central core 56. The temperature gradient across the wall is illustrated in FIG. 4(C).

FIGS. 3(A)–3(D) and 5 illustrate one embodiment of a thermal conditioning station/device 36 in accordance with the present invention which may be used with either of the injection molding systems shown in FIGS. 1 and 2. The station/device 36 is used to prolong the post-mold cooling time without compromising the injection cycle time.

As shown in FIGS. 3(A)–3(D) and 51 the station/device 36 is modular in nature and has the form of a compact box. The foot-print of the box is generally slightly larger than the size of the array of molded preforms ejected from the mold. The height H of the box depends upon the number of batches of molded articles or preforms that need to be cooled simultaneously.

Figure 5:
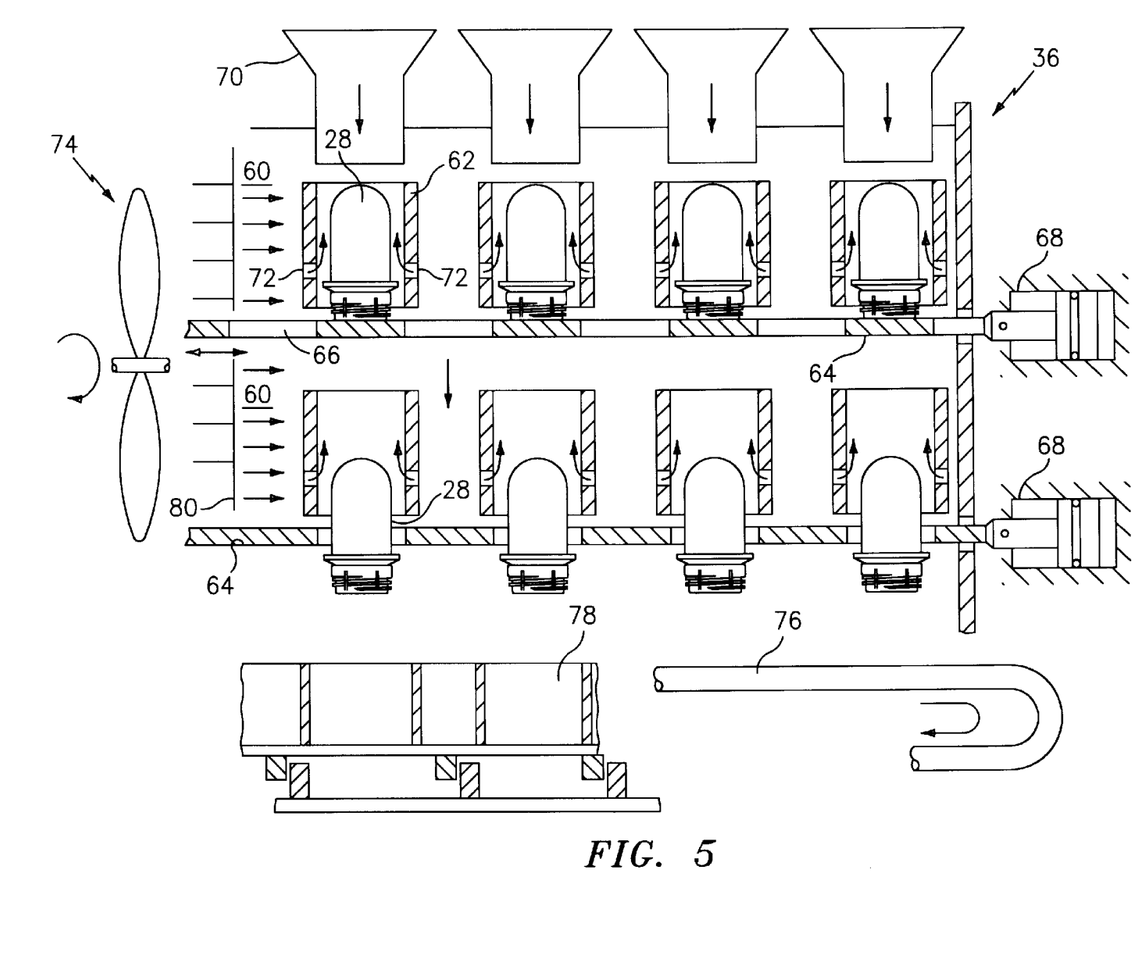
FIG. 5 is a sectional view through a thermal conditioning device in accordance with the present invention.
Figure 6A:
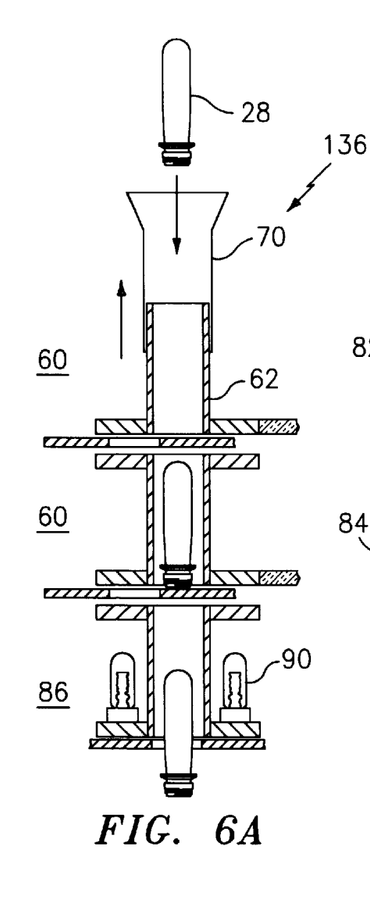
FIGS. 6(A)–6(D) illustrate another embodiment of a thermal conditioning device in accordance with the present invention having a re-heating station.
Figure 6B:
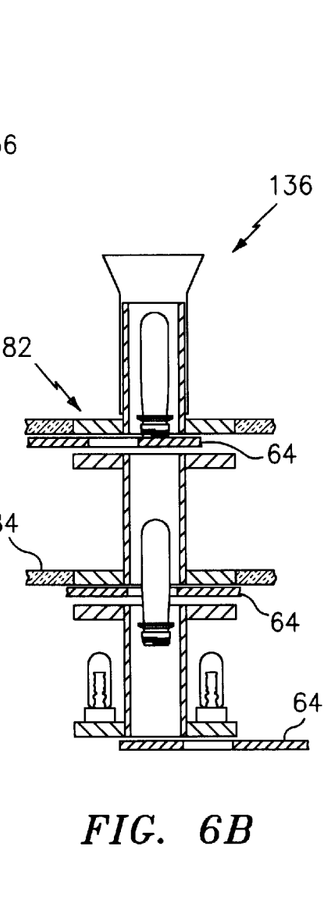
Figure 6C:
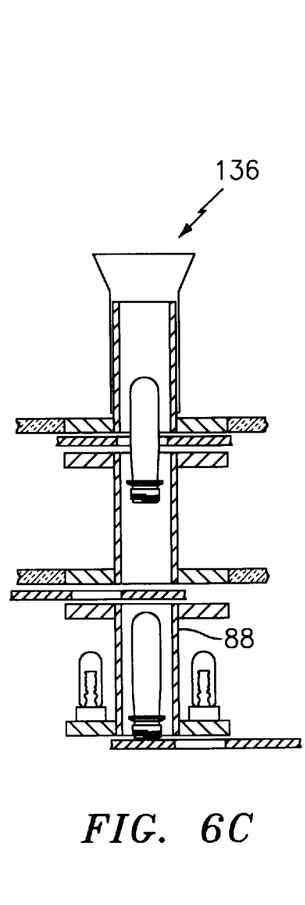
Figure 6D:
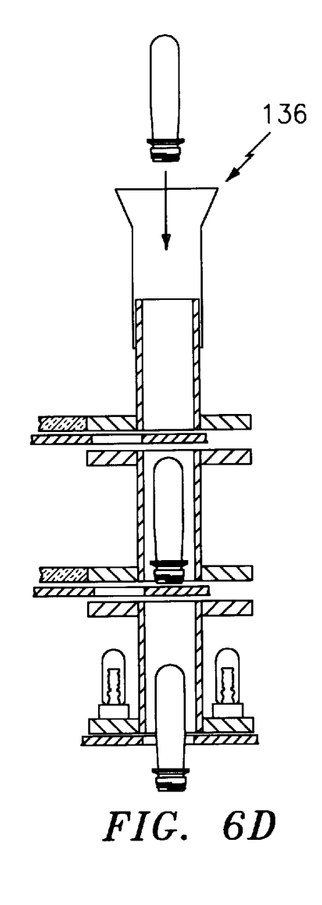

The station/device 36 includes a plurality of cooling levels 60 where different batches of preforms 28 are simultaneously cooled. Each level 60 has a plurality of cooling tubes 62 in which the preforms reside while being cooled. As can be seen from the drawings, the tubes 62 on one level are aligned with the tubes 62 on an adjacent level. The tubes 62 serve to separate the preforms in a particular batch from each other and prevent them from sticking to each other.

The various cooling levels 60 are separated by an axially movable shutter plate 64. The shutter plate 64, as shown in the drawings, includes a number of openings 66. With the outlet of a respective tube 62 at a first level, each opening 66 allows a preform 28 to be freely dropped to a tube 62 on the next cooling level and ultimately out of the device 36. Any suitable means known in the art may be used to move the shutter plates 64 between opening aligned and opening non-aligned positions. For example, an air piston unit 68 may be used to move each shutter plate 64 between a first position where each opening 66 is aligned with an outlet of a respective tube 62 and a second position where a solid portion or portions of the shutter plate block the outlet of each tube 62. This shutter plate system provides the station/device 36 with internal means for automatically transferring each batch of molded preforms from one cooling level to the next.

The station/device 36 preferably contains a plurality of columns of cooling tubes 62 aligned in rows. The columns may define any desired shape or pattern. A particular shutter plate 64 is generally associated with each row of cooling tubes 62. Thus, as shown in FIG. 5, all preforms 28 in a particular batch may be simultaneously retained within cooling tubes 62 on a particular level 60 or simultaneously dropped from a row of cooling tubes. FIG. 3 illustrates the various steps performed during the post-mold cooling process and the relative positions of the preforms 28 and the shutter plates 64 during these steps.

The station/device 36 includes a telescoping tube 70 for receiving the molded articles or preforms 28 from either the take-out plate 32 or the rotary turret core plate device 40. Each telescoping tube 70 is aligned with a respective one of the cooling tubes 62 in the first cooling level 60 and moves between a receiving or extended position and a retracted position. Any suitable means known in the art may be used to move the telescoping tube 70 between its various positions.

To effect cooling, each cooling tube 62 is provided with orifices 72 for allowing cooling air to enter the tube and flow about the preform 28 therein. To generate the flow of cooling air, the station/device 36 has an air blowing device 74 such as a fan associated with it. The air blowing device 74 causes air to circulate amongst the various cooling levels 60 to effect cooling of the preforms 28 by convection. As shown in FIG. 5, the air flow created by the blowing device 74 enters the orifices 72 in the respective cooling tubes and flows around the preforms 28. The air blowing device 74 may be incorporated into the station/device 36 or may be external to it. When external to the station/device, the blowing device 74 blows air through an opening 80 in a wall of the device 36. While FIG. 5 illustrates a single blowing device 74, the cooling device 36 could have individual blowing devices for each cooling level 60. This would allow different levels to be cooled at different rates.

In operation, preforms 28, ejected from the take-out plate 32 or the mold core plate 42, and at a temperature $T_0$ enter the cooling tubes 62 in a first cooling level 60 via the telescoping tubes 70. In this initial phase, the shutter plate 64 is in a tube closed or opening non-aligned position. The preforms 28 in the first level may then be cooled by convection to a desired temperature $T_1$. After the preforms have reached temperature $T_1$, the shutter plate 64 is moved to a tube open position where the openings 66 are aligned with the outlets of the cooling tubes 62 in a particular row. The preforms 28 freely drop to a second cooling level 60 where they may be cooled by convection to a desired temperature $T_2$. After the preforms 28 in a first batch have dropped to a second cooling level, a second batch of preforms may be introduced into the cooling tubes of the first cooling level. In this way multiple batches of preforms may be cooled simultaneously. While FIG. 5 illustrates the station/device 36 as having two cooling levels 60, the device 36 may have any desired number of cooling levels. In this way, more than two batches of preforms may be simultaneously cooled.

After cooling has been completed, the preforms 28 may be dropped from the lowermost cooling level directly onto a conveyor 76 or into a movable preform carrier 78. The carrier 78 may in principle be similar to the carrier disclosed in U.S. Pat. No. 5,772,951, which is hereby incorporated by reference herein. The cooled preforms, if desired, can be eventually transported to the storage and conditioning tower shown in U.S. Pat. No. 5,772,951.

There may be times when the molded articles or preforms 28 must be re-heated following cooling so as to prepare them for a subsequent operation such as a blow molding step. FIG. 6 illustrates a two stage temperature conditioning station 136 which may be used in lieu of the cooling device 36. The first stage of station 136 is for cooling the preforms 28 to prevent crystallinity and deformation and to bring the preforms at the same temperature. The second stage of the station 136 is for re-heating the preforms 28. The cooling stage is similar to the cooling device 36 shown in FIGS. 3(A)–3(D) and 5 and has a plurality of aligned, cooling levels 60 for simultaneously cooling different batches of molded preforms 28. As shown in FIGS. 6(A)–6(D), the station 136 includes a plurality of aligned, cooling tubes 62 on the different cooling levels 60. Telescoping receiving tubes 70 are associated with the uppermost level of cooling tubes 62. As before, a shutter plate 64 is associated with each level to retain the preforms 28 within the cooling tubes 62 and to allow them to freely drop to the next level. Operation of the shutter plate 64 is as previously discussed. Similarly, cooling is effected on each cooling level 60 in the manner previously discussed.

Preferably, walls 82 with thermal insulation 84 incorporated therein are incorporated into the station 136 to prevent heat from the re-heating stage 86 from interfering with the cooling operation.

As shown in FIGS. 6(A)–6(D), the re-heating stage 86 includes a plurality of tubes 88 for receiving cooled preforms. An axially movable shutter plate 64 retains the preforms 28 in the heating tubes 88. As before, the shutter plate 64 includes openings 66 for allowing the heated preforms to be dropped from the tubes 88. Heating sources 90 are positioned adjacent the tubes 88 to effect heating of the preforms therein. Each heating source 90 may comprise any suitable heating means known in the art. According to one embodiment of the present invention, the heating source 90 is located around the preform. By surrounding each preform with a heating source, there is no need to rotate each preform. Control means (not shown) are provided to alter and set the heating temperature individually to each heating source.

If desired, the heating source 90 can be made of several heating elements that completely surround each preform. The heating elements can be a plurality of tubes parallel to the longitudinal axes of the preforms. Alternatively, the heating elements can be in the form of annular tubes perpendicular to the longitudinal axes of the preforms. Preferably, the spectrum of the heating source is in the IR domain when the preforms are made of PET.

There are several advantages to including the heating station in the same "box" with the multi-stage cooling station. First, the injection and blow molding system is relatively small as the two stations are one on top of the other. Second, the transfer from the cooling station to the heating station is the same as the one used for cooling only. This makes the process very fast and simple. Third, there is no need to rotate the preforms during heating.

While FIGS. 6(A)–6(D) illustrate only a single heating level, the station 136 could have multiple heating levels to allow for incremental heating of the preforms.

In another embodiment of the current invention (not shown), the temperature conditioning device can be used solely for the re-heating process. In this case the preforms are partially or fully cooled after the molding step. They are next dropped into the temperature conditioning station where they are solely heated or re-heated using the same design (the heating portion) of FIG. 6. Function of the initial and final temperature of the preforms that enter or exit from the "temperature conditioning station", the number of heating or re-heating stations within the conditioning "box" can vary from 2 to 3, 4 or more. The re-heated preforms are delivered immediately to a blow molding station using known means.

Figures 7A, 7B, 7C:
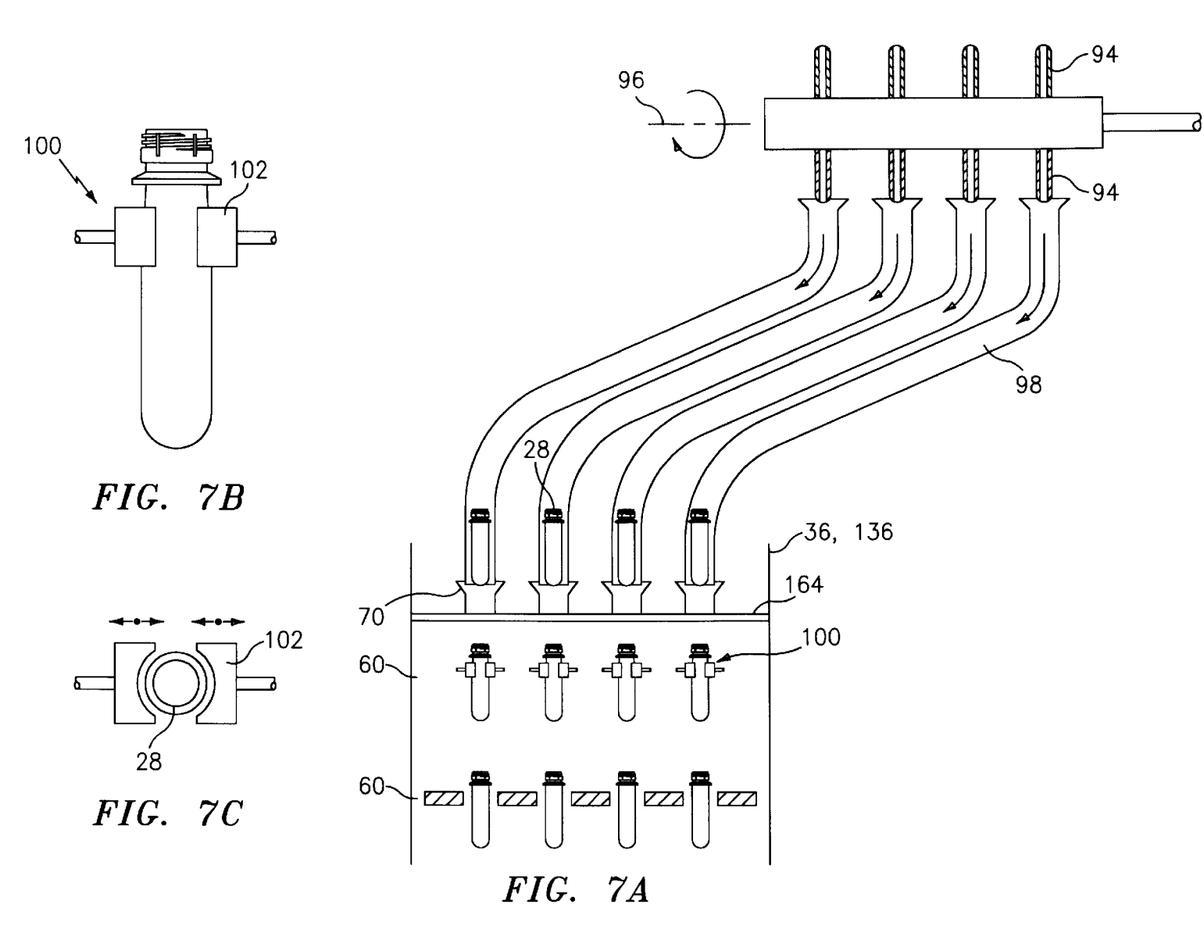
FIGS. 7(A)–7(C) illustrate a cooling frame.

FIGS. 7(A)–7(C) show a cooling frame 92 which may be used with the injection molding system of FIGS. 1 and 2. The cooling frame 92 has a plurality of cooling cores 94 for retaining molded preforms 28. The cooling cores 94 may effect cooling of the preforms in any desired manner, although convection cooling is a preferred mode. The preforms 28 may come directly from the cavity mold or from a take-out plate where the preforms are retained in cooling tubes. The cooling frame 92 is rotatable about an axis 96 so as to enable the preforms 28 on the cores 94 to be dropped into an array of guide tubes 98 that transfer the preforms into the device 36 or the multi-stage thermal conditioning station 136. Any suitable means (not shown) known in the art may be used to rotate the cooling frame 92. Preferably, when the preforms are dropped, they are dropped with the neck finish portion 48 downward. The preforms 28 preferably are retained at each cooling level 60 by retainers 100 in the form of collars 102 that can be automatically open and closed. The retainers 100 replace the shutter plates 64. Any suitable mean known in the art may be used to move the collars 102 between the open and closed positions. This variation of the devices of the present invention provides external cooling which can be supplemented by external cooling provided through the guide tubes 98 by the cooling cores 94. The cooling frame 92 may have one or more faces with cooling cores 94.

A shutter plate 164 may be interposed between the telescoping tubes 70 and the first level of the station/device 36, 136 to control the entry of preforms into the station/device 36, 136. As before, the shutter plate 164 may have openings (not shown) to allow the preforms to drop into the first cooling level. The shutter plate 164 may be axially moved between opening aligned and non-aligned positions in the manner previously discussed.

In a preferred construction, the device 36 and the cooling station 136 are at least partially sealed to create controlled temperature environment for conditioning the molded articles.

As can be seen from the foregoing description, the present invention provides a post-mold cooling process and apparatus which fully satisfies the means, objects and advantages set forth hereinbefore.

What is claimed is:

1. A method for thermally conditioning molded articles outside of a mold comprising the steps of:
    forming a plurality of molded articles in a molding machine;
    removing said molded articles from said molding machine while said articles are warm and not fully solidified;
    providing a thermal conditioning station having at least two internal thermal conditioning levels, said thermal conditioning station comprising a plurality of tubes having a plurality of levels and internal means for automatically transferring molded articles in said tubes from one level to a next level;
    transferring said molded articles to a first level of said thermal conditioning station, said transferring step including placing an individual one of said molded articles into a respective one of said tubes; and
    thermally conditioning said molded articles within said first level of said thermal conditioning station to improve the quality of the molded articles without increasing mold cycle time by subjecting said molded articles to at least one convective thermal treatment.

2. The method according to claim 1, wherein said thermal conditioning step comprises convectively cooling exterior surfaces of said molded articles.

3. The method according to claim 2, wherein said thermal conditioning step further comprises heating said molded articles after said convective cooling step.

4. The method according to claim 1, wherein said thermal conditioning step comprises heating said molded articles while in said thermal conditioning station.

5. The method according to claim 1, further comprising:
    separating said molded articles from each other prior to transferring said molded articles to said first level; and
    said thermal conditioning step comprising simultaneously subjecting said molded articles within said first level to a convective cooling treatment.

6. The method according to claim 1, further comprising:
    said forming step comprising forming a first batch of molded articles;
    separating said molded articles in said first batch; and
    said thermal conditioning step comprising simultaneously subjecting said molded articles in said first batch to a first convective cooling treatment at said first level within said thermal conditioning station.

7. The method according to claim 6, further comprising:
    forming a second batch of molded articles;
    separating said molded articles in said second batch; and
    said thermal conditioning step comprising simultaneously subjecting said molded articles in said second batch to said first convective cooling treatment at said first level and said molded articles in said first batch to a second convective cooling treatment at a second level within said thermal conditioning station.

8. The method according to claim 7, further comprising:
    forming a third batch of molded articles;
    separating said molded articles in said third batch; and
    said thermal conditioning step comprising simultaneously subjecting said molded articles in said third batch to said first convective cooling treatment at said first level, said molded articles in said second batch to said second convective cooling treatment at said second level, and said molded articles in said first batch to a heat treatment at a third level within said thermal conditioning station.

9. The method according to claim 1, wherein:
    said removing step comprises providing a take-out plate for removing said molded articles from said molding machine and positioning said take-out plate between mold core and mold cavity portions of said molding machine to receive said molded articles; and
    said transferring step comprises moving said take-out plate to a position adjacent said molding machine and rotating said take-out plate to align it with an inlet to said thermal conditioning station.

10. The method according to claim 1, wherein:
    said molding machine includes a rotary turret core plate device having a plurality of core plates;
    said forming step comprises moving a first one of said core plates into a mold closed position with a mold cavity portion;
    said removing step comprises moving said first one of said core plates relative to said mold cavity portion so as to withdraw said plurality of molded articles; and
    said transferring step comprises rotating said rotary turret core plate device until said first one of said core plates is aligned with an inlet of said thermal conditioning station and ejecting said molded articles from said first one of said core plates.

11. The method according to claim 1, further comprising cooling said molded articles prior to transferring said molded articles to said thermal conditioning station.

12. The method according to claim 11, wherein:
    said cooling step comprises placing said molded articles on a cooling frame having a plurality of cooling cores and cooling said molded articles on said cooling cores; and said transferring step comprises moving said cooling frame to a position where it is aligned with said thermal conditioning station and ejecting said cooling molded articles from said cooling frame.

13. The method according to claim 1, further comprising:
said thermal conditioning step comprising subjecting each said molded article to a flow of cooling air for a first period of time while each said molded article is positioned at said first level in said tubes.

14. The method according to claim 13, further comprising:
actuating said internal means so as to allow each said molded article to freely drop to a second level in each said tube; and
said thermal conditioning step further comprising subjecting each said molded article to a flow of cooling air for a second period of time while each said molded article is positioned at said second level.

15. The method according to claim 14, wherein said second period of time is different from said first period of time.

16. The method according to claim 14, further comprising:
activating said internal means to allow each said molded article in said tubes to freely drop to a third level; and
said thermal conditioning step further comprising subjecting each said molded article to a heat treatment while at said third level.

17. The method according to claim 16, further comprising ejecting said molded articles from said thermal conditioning station after said thermal conditioning step has been completed and conveying said molded articles to a desired location.

18. A thermal conditioning station for thermally treating molded articles comprising:
means for keeping separate different batches of said molded articles;
said keeping means comprises a plurality of columnar tubes;
internal means for holding said molded articles in respective ones of said batches at different levels in said station; and
means for simultaneously thermally treating said molded articles in said batches.

19. The thermal conditioning station of claim 18, further comprising:
said plurality of columnar tubes each being formed by a plurality of aligned tube elements;
each said tube element having an inlet and an outlet;
said internal holding means comprising a shutter plate positioned between adjacent ones of said aligned tube elements;
said shutter plate having at least one opening therein for cooperating with the outlet of at least one of said tube elements; and
means for moving the shutter plate between a first position wherein said shutter plate blocks the outlet said at least one tube element and thereby holds a respective one of said molded articles in said at least one tube element at a first level and a second position where said at least one opening is aligned with the outlet of said at least one tube element to allow said molded article in said at least one tube element to freely drop to a second level in said station.

20. The thermal conditioning station of claim 19, wherein the thermal station is modular in nature and said columnar tubes are arranged in a plurality of rows.

21. The thermal conditioning station of claim 19, further comprising means for convectively cooling said molded articles while said molded articles are at different ones of said levels within said station.

22. The thermal conditioning station of claim 21, wherein each said tube element has at least one opening in a sidewall through which a cooling gas could flow and wherein said station has means for causing a flow of cooling gas in selected ones of said tube elements.

23. The thermal conditioning station of claim 22, further comprising:
a housing surrounding said tubes, said housing having an opening in a sidewall; and
said means for causing a flow of cooling gas comprises fan means positioned outside of said housing for causing a flow of air through said opening in said housing sidewall.

24. The thermal conditioning station of claim 19, further comprising:
said tubes being aligned in at least one row;
each said tube being formed by three separate and aligned tube elements; and
at least two shutter plates associated with each said tube in said at least one row with a first one of said shutter plates being positioned between a first one and a second one of said tube elements of each said tube in said at least one row and a second one of said shutter plates being positioned between said second tube element and a third tube element of each said tube in said at least one row.

25. The thermal conditioning station of claim 24, further comprising means for actuating each said shutter plate so as to automatically transfer each said molded article in each said tube from one level to the next.

26. The thermal conditioning station of claim 24, further comprising a third shutter plate located adjacent an outlet of each said third tube element.

27. The thermal conditioning station of claim 24, further comprising means for heating a molded article located within said third tube element.

28. The thermal conditioning station of claim 27, further comprising a wall having thermal insulating located between said level where said heating occurs and an adjacent level where cooling occurs.

29. The thermal conditioning station of claim 19, further comprising an extensible and retractable tube element movable relative to each said tube element for capturing a molded article to be thermally treated.

30. The thermal conditioning station of claim 18, wherein said internal holding means comprises a retainer at each level where said molded article is to be subjected to a thermal treatment.

31. The thermal conditioning station of claim 30, wherein each said retainer comprises axially movable collars for gripping portions of said molded article.

32. The thermal conditioning station of claim 18, further comprising an array of guide tubes for guiding said molded articles into said station.

33. The thermal conditioning station of claim 32, further comprising:
said guide tube array having a plurality of outlets; and
a shutter plate positioned between each said outlet of said guide tube array and an inlet of said station, said shutter plate being movable between a first position where it blocks entry of said molded articles into said station and a second position where it allows entry of said molded articles into said station.

34. An apparatus for thermally conditioning molded articles outside of a molding machine comprising:

means for removing said molded articles from said molding machine while said articles are warm and not fully solidified;
   a thermal conditioning station external to said molding machine, said thermal conditioning station including at least two internal thermal conditioning levels;
   means for transferring said molded articles to said thermal conditioning station;
   said thermal conditioning station having means for subjecting said molded articles to at least one thermal conditioning treatment at a first one of said internal levels to improve the quality of the molded articles without increasing the mold cycle time of the molded machine; and
   said thermal conditioning station comprising a plurality of tubes for receiving said molded articles and internal means associated with each tube for holding a molded article therein at said first one of said levels and subsequently at a second one of said levels.

35. The apparatus of claim 34, wherein said subjecting means comprises means for convectively cooling exterior surfaces of said molded articles at said first one of said levels.

36. The apparatus of claim 35, wherein said subjecting means further comprises means for heating said molded articles after cooling.

37. The apparatus of claim 34, wherein said subjecting means comprises means for heating said molded articles while said molded articles are resident in said thermal conditioning station.

38. The apparatus of claim 34, wherein said removing and transferring means comprises a take-out plate for receiving molded articles from said molding machine while they are still warm.

39. The apparatus of claim 38, wherein said transferring means further comprises a rotatable frame having a plurality of cooling cores on a plurality of faces, said cooling cores mating with said take-out plate to receive said molded articles and said frame rotating so that cooled molded articles may be dispensed into said thermal conditioning station.

40. The apparatus of claim 34, wherein said plurality of tubes keeps molded articles in a batch separate from each other while said molded articles undergo said at least one thermal conditioning treatment.

41. The apparatus of claim 40, wherein said transferring means further comprises an array of guide tubes having outlets aligned with inlets to said tubes.

42. The apparatus of claim 34, wherein:
   said molding machine has a rotary turret core plate device with a plurality of core faces which mate with a cavity portion of said machine;
   said removing means comprises means for moving one of said core faces away from said cavity portion; and
   said transferring means comprises means for rotating said rotary turret core plate device until said molded articles removed from said machine are aligned with said thermal conditioning station and means for ejecting said molded articles.

43. The apparatus of claim 34, further comprising means for actuating said internal holding means to allow said molded article in each said tube to automatically transfer from said first one of said levels to said second one of said levels.

44. The apparatus of claim 34, further comprising:
   each said tube being columnar in nature and being formed from a plurality of aligned tube elements; and
   said internal holding means being formed by at least one shutter plate between adjacent ones of said tube elements, each said shutter plate having an opening therein which can b e aligned with an outlet of a first one of said tube elements and an inlet of a second one of said tube elements and being movable between a first position where a solid portion of each said shutter plate holds said molded article at a first one of said levels by blocking said outlet of said first one of said tube elements and a second position where said opening is aligned with said outlet of said first one of said tube elements to allow said molded article to freely transfer to said second one of said levels.

45. The apparatus of claim 44, wherein:
   each said tube has three aligned tube elements; and
   said internal holding means comprises two shutter plates with a first one of said shutter plates being located intermediate a first one and a second one of said three tube elements and a second one of said shutter plates being located intermediate said second one and a third one of said three tube elements, whereby said shutter plates are actuated to allow a molded article in said tube to be subjected to thermal treatments at three different levels in said station.

46. The apparatus of claim 34, wherein said thermal conditioning station has means for cooling a first batch of molded articles at said first one of said levels and means for simultaneously cooling a second batch of molded articles at said second one of said levels.

47. The apparatus of claim 46, further comprising said thermal conditioning station having means for heating a third batch of molded articles while said first and second batches of molded articles are being cooled.

48. The apparatus of claim 46 wherein said cooling means comprises a plurality of tubes in which said molded articles reside and each said tube having at least one orifice for allowing cooling air to flow around at least one molded carticle within each said tube and means for creating said flow of cooling air.

49. The apparatus of claim 48, wherein said thermal conditioning station includes a housing and said cooling air flow creating means are located external to said housing.

* * * * *

UNITED STATES PATENT AND TRADEMARK OFFICE
CERTIFICATE OF CORRECTION

PATENT NO : 6,139,789
DATED : Oct. 31, 2000
INVENTOR(S) : Witold Neter, et al.

It is certified that error appears in the above-identified patent and that said Letters Patent are hereby corrected as shown below:

In column 14, claim 44, line 17, "b e" should read --be--
In column 14, claim 48, line 51, "carticle" should read --article--

Signed and Sealed this

Eighth Day of May, 2001

*Attest:*

NICHOLAS P. GODICI

*Attesting Officer*     *Acting Director of the United States Patent and Trademark Office*